(12) United States Patent
Takei

(10) Patent No.: US 8,261,861 B2
(45) Date of Patent: Sep. 11, 2012

(54) COOLING APPARATUS FOR A HYBRID VEHICLE

(75) Inventor: Toshio Takei, Shizuoka-ken (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 0 days.

(21) Appl. No.: 12/889,562

(22) Filed: Sep. 24, 2010

(65) Prior Publication Data

US 2011/0067942 A1    Mar. 24, 2011

(30) Foreign Application Priority Data

Sep. 24, 2009  (JP) ................. 2009-218938

(51) Int. Cl.
*B60K 6/20*  (2007.10)
(52) U.S. Cl. ..................... 180/65.22; 180/291
(58) Field of Classification Search .......... 180/291–300, 180/65.1, 65.21–2, 65.31, 68.12
See application file for complete search history.

(56) References Cited

U.S. PATENT DOCUMENTS

| | | | | |
|---|---|---|---|---|
| 5,537,956 A | * | 7/1996 | Rennfeld et al. ........... 123/41.29 |
| 6,048,289 A | * | 4/2000 | Hattori et al. .................. 477/15 |
| 6,213,233 B1 | * | 4/2001 | Sonntag et al. .......... 180/65.245 |
| 6,332,497 B1 | * | 12/2001 | Niwa et al. ..................... 165/204 |
| 6,450,275 B1 | * | 9/2002 | Gabriel et al. ............. 180/65.23 |
| 6,467,286 B2 | * | 10/2002 | Hasebe et al. .................. 62/185 |
| 7,281,909 B2 | * | 10/2007 | Uno et al. ...................... 417/374 |
| 7,284,594 B2 | * | 10/2007 | Sanada et al. ................... 165/41 |
| 2005/0244691 A1 | * | 11/2005 | Varenne .......................... 429/26 |
| 2005/0274507 A1 | * | 12/2005 | Sanada et al. ................. 165/202 |
| 2010/0147611 A1 | * | 6/2010 | Amano et al. ............... 180/68.1 |
| 2010/0305793 A1 | * | 12/2010 | Kidston et al. .................. 701/22 |

FOREIGN PATENT DOCUMENTS

JP    10-238345 A    9/1998

* cited by examiner

*Primary Examiner* — John Walters
*Assistant Examiner* — James Triggs
(74) *Attorney, Agent, or Firm* — Marsh Fischmann & Breyfogle LLP

(57) ABSTRACT

A cooling apparatus for a hybrid vehicle including a power unit which is arranged at a position between a pair of right and left-hand members so as to be offset towards an engine-side side member of the pair of right and left-hand members. A gap formed between the generator and a generator-side side member of the pair of right and left-hand members is larger than a gap formed between the engine and the engine-side side member, thereby avoiding propagation of heat from the generator and the drive motor to the inverter and improving the heat radiating performance of the first radiator.

2 Claims, 2 Drawing Sheets

COOLING APPARATUS FOR A HYBRID VEHICLE

FIELD OF THE INVENTION

The invention relates to a cooling apparatus for a hybrid vehicle and, more particularly, to a cooling apparatus for a hybrid vehicle which can ensure adequate cool cooling of an engine and a motor apparatus mounted in the hybrid vehicle.

BACKGROUND OF THE INVENTION

In a hybrid vehicle, a power unit made up by an engine, a generator which is driven by the engine, a drive motor, a differential apparatus, and the like, an inverter for adjusting an electrical power supplied to the drive motor, and a cooling apparatus are arranged between a pair of side members arranged in both side portions of an engine compartment in the vehicle width direction. Here, the generator and the drive motor are arranged in a side portion of the engine in the vehicle width direction. In order to enable the wiring of the inverter to be easily arranged, the inverter is often arranged to lie about the generator and the drive motor.

Since the amount of heat generated by the engine and the amount of heat generated by the motor apparatus essentially comprising the generator, drive motor, and inverter, are different, the cooling apparatus is divided into an engine cooling circuit for cooling the engine; and a motor apparatus cooling circuit for cooling the motor apparatus. A radiator for the engine and a radiator for the motor apparatus are provided for these cooling circuits. The radiator for the engine and the radiator for the motor apparatus are arranged in the vehicle width direction and disposed in a front portion of the engine compartment.

Such an arrangement is typified in prior art published Japanese patent application No. JP-A-10-238345.

PROBLEM TO BE SOLVED BY THE INVENTION

However, in the case where the radiator for the engine and the radiator for the motor apparatus are arranged in the vehicle width direction and are disposed in the front portion of the engine compartment and the inverter lies above the generator and the drive motor which are arranged behind their respective radiators, a problem arises in that heat from the generator and the drive motor is easily propagated to the inverter when it is arranged over the generator and the drive motor, and air stream penetration of the radiator arranged on the inverter side in the vehicle width direction deteriorates leading to a deterioration in cooling performance.

SUMMARY OF THE INVENTION

It is an object of the invention to improve cooling performance so that an engine and a motor apparatus mounted in a hybrid vehicle can be sufficiently cooled.

According to the invention, cooling apparatus is provided for a hybrid vehicle in which:

a pair of right and left-hand members are arranged at respective side portions of an engine compartment in a vehicle width direction;

a power unit, in which an engine and a generator are arranged in the vehicle width direction and a drive motor and a differential apparatus are arranged behind the generator substantially one above the other in a vehicle vertical direction, is arranged between the said side members;

an inverter for adjusting electrical power supplied to said drive motor arranged to lie above said generator and said drive motor;

and a first radiator provided for an engine cooling circuit for cooling said engine and a second radiator provided for a motor apparatus cooling circuit for cooling motor apparatus substantially comprising said generator, said drive motor, and said inverter are arranged in the vehicle width direction and disposed at a front portion of the engine compartment, wherein the power unit is arranged at a position between said pair of right and left-hand members so as to be offset towards an engine-side side member of said pair of right and left-hand members whereby a gap formed between said generator and a generator-side side member of said pair of right and left-hand members is larger than a gap formed between said engine and said engine-side side member.

The cooling apparatus for the hybrid vehicle of the invention, in which the power unit is at a position between said pair of right and left-hand members so as to be offset towards an engine-side side member, has the advantage of reducing the area where the inverter lies above the generator and the drive motor in the vehicle vertical direction thereby avoiding a situation where heat generated in the generator and drive motor are propagated to the inverter.

According to the cooling apparatus for a hybrid vehicle of the invention, by widening the gap between the generator and the drive motor and the adjacent side member, a passage for ejecting the cooling air stream which has passed through the first or second radiator can be formed below the inverter. Therefore, according to the cooling apparatus for a hybrid vehicle of the invention, an amount of cooling air stream which passes through the first or second radiator arranged in front of the inverter is increased and cooling performance for a hybrid vehicle can be improved.

As mentioned above, according to the cooling apparatus for a hybrid vehicle of the invention, propagation of heat from the generator and the drive motor to the inverter can be prevented and heat radiating performance of the first and second radiator arranged in front of the inverter can be improved, so that cooling performance for a hybrid vehicle can be improved.

DETAILED DESCRIPTION OF A PREFERRED EMBODIMENT

An embodiment of the invention will be described below with reference to the drawings.

According to the invention, by arranging a power unit at a position between the pair of right and left-hand members so as to be offset towards an engine-side side member, a gap which is formed between the generator and the generator-side side member is increased, propagation of heat from the generator and drive motor to the inverter is prevented, heat radiating performance of a first and second radiator in front of the inverter is improved, and cooling performance is improved.

Figure 1:
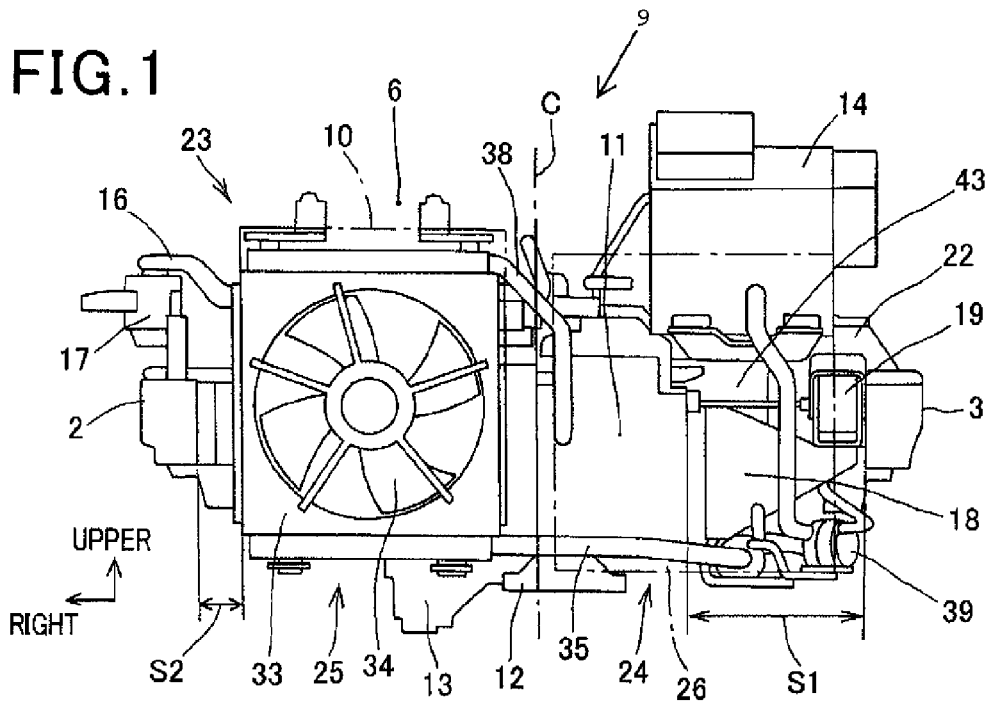
FIG. 1 is a front view of an engine compartment of a hybrid vehicle.
Figure 2:
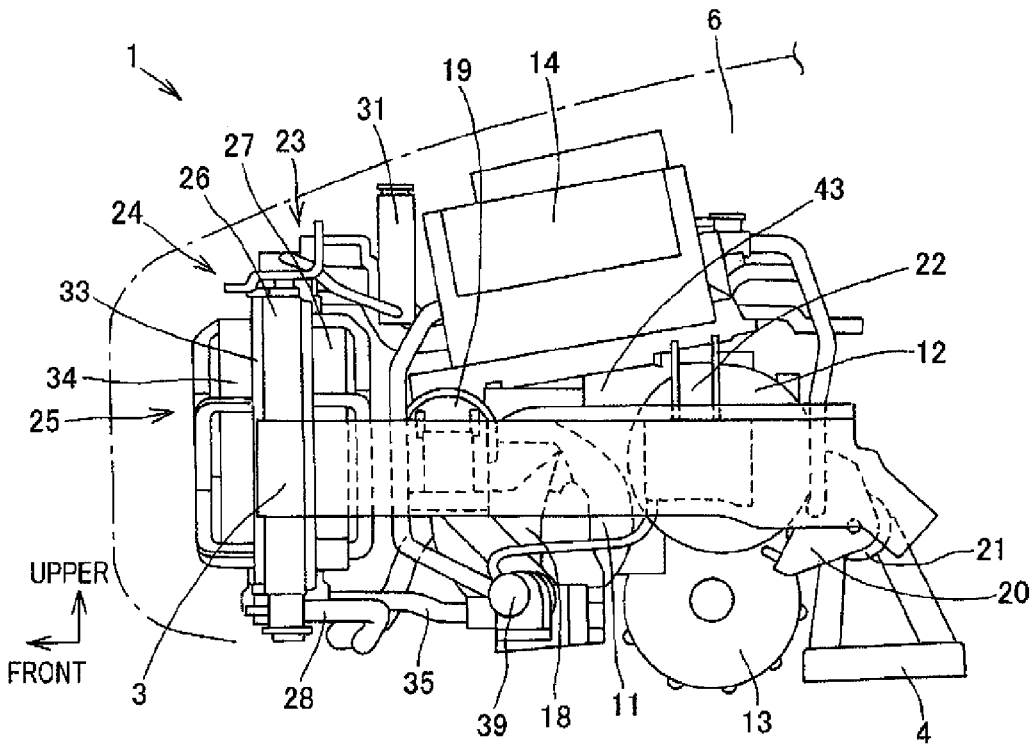
FIG. 2 is a side elevation view of the engine compartment of the hybrid vehicle.
Figure 3:
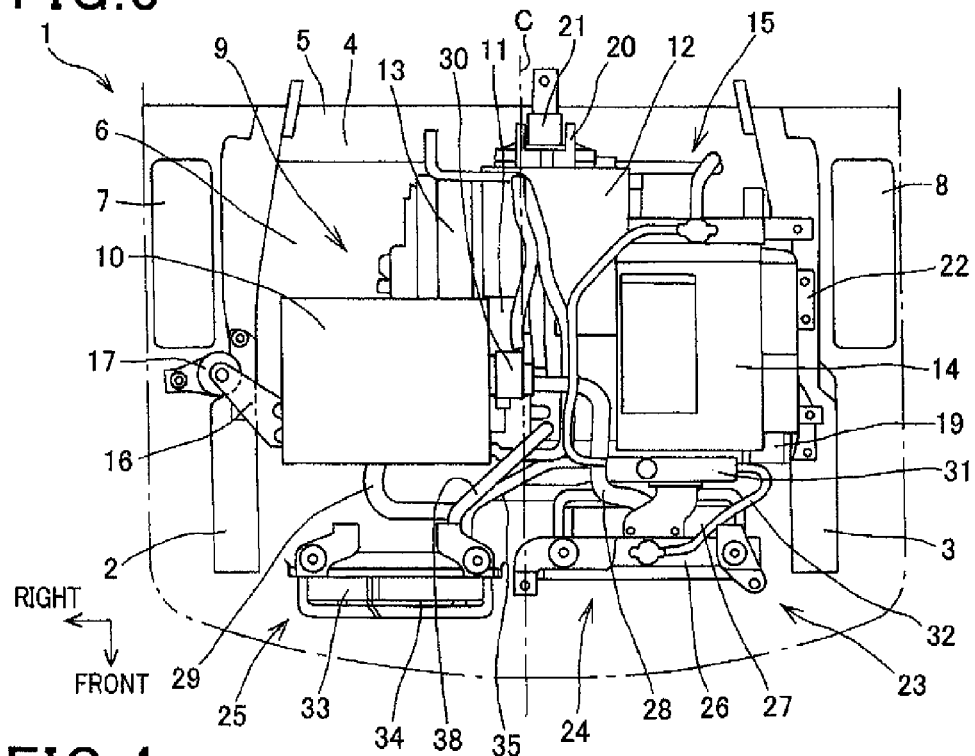
FIG. 3 is a plan view of the engine compartment of the hybrid vehicle.

FIGS. 1 to 4 show an embodiment of the invention. In FIGS. 1 to 3, reference numeral 1 denotes a hybrid vehicle; 2 and 3 right and left-hand members; 4 a cross member; 5 a dash panel; 6 an engine compartment; and 7 and 8 right and left front wheels. In the hybrid vehicle 1, the pair of right and left-hand members 2 and 3 are arranged at both sides in the vehicle width direction. Both ends of the cross member 4 in the vehicle width direction are coupled with lower portions of the right and left-hand members 2 and 3 at the dash panel 5 side. The engine compartment 6 is located at the front side of dash panel 5. The right and left front wheels 7 and 8 are arranged outside of the right and left-hand members 2 and 3.

In the hybrid vehicle 1, a power unit 9 is arranged between the right and left-hand members 2 and 3 of engine compartment 6. The power unit 9 essentially consists of: an engine 10; a generator 11 which is driven by the engine 10; a drive motor 12 which is driven by electric power generated from generator 11; a differential apparatus 13 for propagating a driving force of drive motor 12 to the right and left front wheels 7 and 8. As shown in FIGS. 2 and 3, in the power unit 9, the engine 10 and the generator 11 are arranged in the vehicle width direction and the drive motor 12 and the differential apparatus 13 are arranged behind the generator 11 one above the other in the vehicle vertical direction.

In the hybrid vehicle 1, an inverter 14 for adjusting the electrical power supplied to the drive motor 12 is arranged over the generator 11 and drive motor 12. The inverter 14 makes up part of the motor apparatus 15 along with generator 11 and drive motor 12.

In the power unit 9, the generator 11 is coupled to the left side of the engine 10 in the vehicle width direction, drive motor 12 is arranged over the rear side of the generator 11 in the vehicle front/rear direction, and the differential apparatus 13 is coupled under the right side of drive motor 12 in the vehicle width direction.

As shown in FIG. 3, in the engine 10, a right-hand engine mount bracket 16 is attached at the right in the vehicle width direction and right-hand engine mount bracket 16 is connected to a right-hand mount 17 attached to the right-hand member 2 located near the right side of the engine 10 in the vehicle width direction. As shown in FIGS. 1 and 2, in the generator 11, a left-hand mount bracket 18 is attached to the left side of the generator 11 in the vehicle width direction and left-hand mount bracket 18 is connected to a left-hand mount 19 attached to the left-hand member 3 located so as to be away from the left side of generator 11 in the vehicle width direction. As shown in FIGS. 1 and 2, in drive motor 12, a rear mount bracket 20 is attached to the rear side of drive motor 12 in the vehicle front/rear direction and rear mount bracket 20 is connected to a rear mount 21 attached to the cross member 4 located near the rear side of drive motor 12 in the vehicle front/rear direction.

As shown in FIGS. 1 and 2, in the inverter 14, an inverter bracket 22 is attached to the left side in the vehicle width direction and inverter bracket 22 is attached to the left-hand member 3 located near the left side of the inverter 14 in the vehicle width direction.

Figure 4:
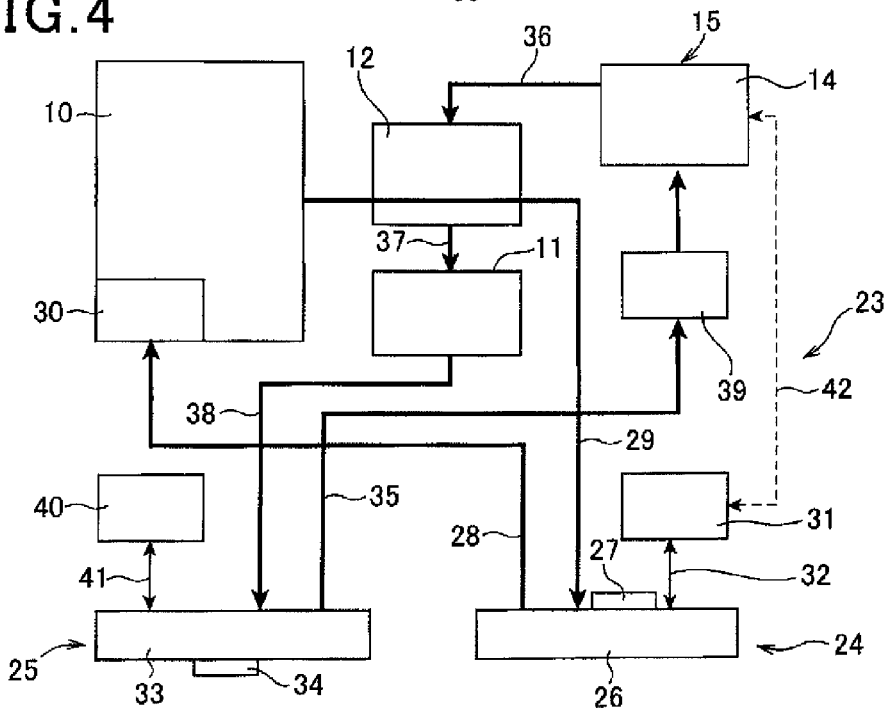
FIG. 4 is a diagram of the cooling circuit of the cooling apparatus.

In the hybrid vehicle 1, a cooling apparatus 23 for cooling the engine 10, generator 11, drive motor 12, and inverter 14 is arranged in the engine compartment 6. As shown in FIG. 4, the cooling apparatus 23 is made up by: an engine cooling circuit 24 for cooling the engine 10; and a motor apparatus cooling circuit 25 for cooling the generator 11, drive motor 12, and inverter 14 making up motor apparatus 15.

The cooling circuit 24 for the engine has a first engine radiator 26 for cooling the cooling water of engine 10. The first radiator 26 has a first cooling fan 27 and is coupled with the engine 10 by an outlet hose 28 for the engine and an inlet hose 29 for the engine. An engine water pump 30 which is driven by engine 10 is provided for an extremity of engine outlet hose 28 on the side of the engine. A reserve tank 31 for the engine is coupled with the first radiator 26 by a reserve hose 32 for the engine.

In the cooling circuit 24 for the engine, the cooling water is circulated between the first radiator 26 and the engine 10 by the water pump 30 and the engine 10 is cooled by the cooling water cooled by first radiator 26.

The cooling circuit 25 for the motor apparatus has a second radiator 33 for cooling the cooling water of motor apparatus 15. The second radiator 33 has a second cooling fan 34 and is coupled with the inverter 14 by an outlet hose 35. An intermediate hose 36 couples inverter 14 to drive motor 12. An intermediate hose 37 couples drive motor 12 to generator 11. Generator 11 is coupled to the second radiator 33 by a motor apparatus inlet hose 38. An electric water pump 39 for the motor apparatus is provided in the path of motor apparatus outlet hose 35. A reserve tank 40 for the motor apparatus is coupled with the second radiator 33 by a motor apparatus reserve hose 41.

In the motor apparatus cooling circuit 25, the cooling water is circulated between the second radiator 33 and the inverter 14, drive motor 12, and generator 11 by the electric water pump 39 for the motor apparatus. The inverter 14, drive motor 12, and generator 11 are cooled by the cooling water cooled by the second radiator 33.

Regarding the reserve tank 40 for the motor apparatus of the cooling circuit 25 for the motor apparatus, as shown by a broken line in FIG. 4, by coupling the inverter 14 with the reserve tank 31 for the engine by a different reserve hose 42 for the motor apparatus, the reserve tank 40 can be integrated with the reserve tank 31 for the engine and can be omitted.

As shown in FIG. 3, in the cooling apparatus 23 for a hybrid vehicle 1, the first radiator 26 provided for the engine cooling circuit 24 for cooling the engine 10 and the second radiator 33 provided for the motor apparatus cooling circuit 25 for cooling the motor apparatus 15 essentially consisting of generator 11, drive motor 12, or inverter 14 are arranged in the vehicle width direction and are disposed in a front portion ahead of power unit 9 in engine compartment 6.

As shown in FIG. 1, in the hybrid vehicle 1, the power unit 9 is arranged at a position offset in the direction of the right-hand member 2 located at a side of the engine 10 between right and left-hand members 2 and 3 in a manner such that a gap S1 which is formed between the generator 11 and the left-hand member 3 located so as to be away from the side on the left side of the generator 11 in the vehicle width direction is larger than a gap S2 (S1>S2) formed between engine 10 and the right-hand member 2 located near the side on the right side of the engine 10 in the vehicle width direction.

By connecting the left-hand mount bracket 18 securing generator 11 to the left-hand mount 19 attached to the left-hand member 3 at a position well away from the left side of generator 11 in the vehicle width direction, the power unit 9 is mounted in the engine compartment 6 so as to be offset to the right in the vehicle width direction with respect to a vehicle center line C extending in the vehicle front/rear direction at the midpoint in the vehicle width direction. The gap S1 is formed between the generator 11 and the left-hand member 3. The gap S1 is arranged to be larger than the gap S2 formed between the engine 10 and the right-hand member 2. Since the power unit 9 is positioned so as to be offset to the right in the vehicle width direction, the generator 11 and drive motor 12 are positioned to the right in the vehicle width direction and inverter 14 to the left in the vehicle width direction so as to be away from each other.

Thus, according to the cooling apparatus 23 for the hybrid vehicle 1, by reducing areas where the generator 11 and drive motor 12 on the one hand and the inverter 14 on the other hand are directly one above the other in the vehicle vertical direction, the situation in which heat generated in the generator 11 and drive motor 12 are propagated to the inverter 14 located over them can be prevented.

In the cooling apparatus 23, by widening the gaps S1 which are formed between the generator 11 and drive motor 12 and the left-hand member 3 located at the sides thereof, as shown in FIGS. 1 and 2, a passage 43 for ejecting the cooling air stream which has passed through the first radiator 26 for the engine can be formed under the inverter 14.

Therefore, according to the cooling apparatus for a hybrid vehicle 1, the amount of cooling air stream passing through the first radiator 26 arranged in front of the inverter 14 is increased and cooling performance of the first radiator 26 can be improved.

As mentioned above, in the cooling apparatus 23 for a hybrid vehicle 1, since propagation of heat from the generator 11 and drive motor 12 to the inverter 14 can be prevented and heat radiating performance of the first radiator 26 arranged in front of the inverter 14 can be improved, the cooling performance for a hybrid vehicle 1 can be improved.

In the cooling apparatus 23, the first radiator 26 is arranged at a position which overlays the inverter 14 in the vehicle front/rear direction.

According to the cooling apparatus 23 for a hybrid vehicle 1, the first radiator 26 for the engine in which the amount of heat generated is larger than that in the motor apparatus 15 essentially comprising generator 11, drive motor 12, and inverter 14, and for which the necessity of cooling is greater than that of the second radiator 33 for the motor apparatus 15 is arranged at a position which overlays the inverter 14 in the vehicle front/rear direction when seen from the front of the vehicle 1. Thus, the passage 43 for ejecting the cooling air stream which has passed through the first radiator 26 can be formed by the gap S1 under the inverter 14. Adequate heat dissipation necessary for the first radiator 26 can be assured.

According to this invention, propagation of heat from the generator and the drive motor to the inverter is prevented and the heat radiating performance of the first radiator for the engine, arranged in front of the inverter, is improved. The invention is not limited to hybrid vehicles but can be also applied to a vehicle in which a power unit substantially comprising a gasoline engine or the like has been mounted.

LIST OF MAIN REFERENCE NUMERALS

1. Hybrid vehicle
2. Right-hand member
3. Left-hand member
4. Cross member
5. Dash panel
6. Engine compartment
9. Power unit
10. Engine
11. Generator
12. Drive motor
13. Differential apparatus
14. Inverter
15. Motor apparatus
23. Cooling apparatus
24. Cooling circuit for engine
25. Cooling circuit for motor apparatus
26. First radiator
33. Second radiator

What is claimed is:

1. A cooling apparatus for a hybrid vehicle, in which:
a pair of right and left-hand members are arranged at respective side portions of an engine compartment in a vehicle width direction;
a power unit, in which an engine and a generator are arranged in the vehicle width direction and a drive motor and a differential apparatus are arranged behind the generator with the drive motor above the differential apparatus in a vehicle vertical direction, is arranged between the said side members;
an inverter for adjusting electrical power supplied to said drive motor arranged to lie above said generator and said drive motor; and
a first radiator provided for an engine cooling circuit for cooling said engine and a second radiator provided for a motor apparatus cooling circuit for cooling a motor apparatus substantially comprising said generator, said drive motor, and said inverter arranged in the vehicle width direction and disposed at a front portion of the engine compartment,
wherein said power unit is arranged at a position between said pair of right and left-hand members so as to be offset towards an engine-side side member of said pair of right and left-hand members whereby a first gap formed between said generator and a generator-side side member of said pair of right and left-hand members is larger than a second gap formed between said engine and said engine-side side member;
wherein a passage for the cooling air stream is formed under the inverter by the first gap; and
wherein the power unit is positioned so as to be offset in the vehicle width direction, and wherein the generator and drive motor are away from the inverter in the vehicle width direction so as to prevent the propagation of heat generated in the generator and drive motor to the inverter located over them.

2. The cooling apparatus for a hybrid vehicle according to claim 1, wherein said first radiator is arranged at a position overlaying in a vehicle front/rear direction, said inverter.

* * * * *